(12) United States Patent
Andersson (10) Patent No.: US 11,624,602 B2
(45) Date of Patent: Apr. 11, 2023

(54) STEPWISE ADJUSTABLE SQUARE

(71) Applicant: Hultafors Group AB, Bollebygd (SE)

(72) Inventor: Göran Andersson, Borås (SE)

(73) Assignee: HULTAFORS GROUP AB, Bollebygd (SE)

( * ) Notice: Subject to any disclaimer, the term of this patent is extended or adjusted under 35 U.S.C. 154(b) by 281 days.

(21) Appl. No.: 17/015,262

(22) Filed: Sep. 9, 2020

(65) Prior Publication Data

US 2021/0072011 A1 Mar. 11, 2021

(30) Foreign Application Priority Data

Sep. 10, 2019 (EP) ..................................... 19196421

(51) Int. Cl.
| | | |
|---|---|---|
| *G01B 3/56* | (2006.01) | |
| *G01B 1/00* | (2006.01) | |
| *G01B 3/06* | (2006.01) | |
| G01B 3/00 | (2006.01) | |

(52) U.S. Cl.
CPC ............... *G01B 3/566* (2013.01); *G01B 1/00* (2013.01); *G01B 3/06* (2013.01); G01B 3/004 (2013.01)

(58) Field of Classification Search
CPC .................................. G01B 3/566; G01B 3/06
See application file for complete search history.

(56) References Cited

U.S. PATENT DOCUMENTS

| | | | |
|---|---|---|---|
| 304,196 A | 8/1884 | Hill | |
| 579,023 A * | 3/1897 | Stoy | ........................ G01B 3/566 403/92 |
| 1,226,172 A | 5/1917 | Benjamin | |
| 1,295,841 A * | 3/1919 | Benjamin | ............... G01B 3/566 403/97 |
| 1,663,821 A | 3/1928 | Tuomi | |
| 2,775,037 A * | 12/1956 | Baumunk | ............... G01B 3/566 33/499 |
| 2,837,826 A | 6/1958 | Cox | |
| 2,942,634 A | 6/1960 | Gathercoal | |
| 4,267,642 A | 5/1981 | Stapleford | |
| 4,446,627 A * | 5/1984 | Persson | ..................... B43L 7/12 33/497 |

(Continued)

FOREIGN PATENT DOCUMENTS

| | | | |
|---|---|---|---|
| CH | 138040 A | 2/1930 | |
| EP | 3832250 A1 * | 6/2021 | ............... B25H 7/02 |

(Continued)

OTHER PUBLICATIONS

Extended European Search Report dated Aug. 27, 2021, issued by the European Patent Office in corresponding European Application No. 21160979.7-1017, (5 pages).

(Continued)

*Primary Examiner* — Christopher W Fulton
(74) *Attorney, Agent, or Firm* — Buchanan Ingersoll & Rooney P.C.

(57) ABSTRACT

A stepwise adjustable square for use in carpentry, including: a stock; and a blade rotatable relative to the stock around an axis of rotation between a first extreme position at zero degrees, where the blade is parallel to the stock and partly provided in a space of the stock, and a second extreme position at about 270 degrees, where the blade is substantially perpendicular to the stock.

11 Claims, 6 Drawing Sheets

(56) References Cited

U.S. PATENT DOCUMENTS

| | | | |
|---|---|---|---|
| 4,562,649 A | | 1/1986 | Ciavarella |
| 4,920,658 A | * | 5/1990 | Hile ................ G01B 3/566 |
| | | | 33/499 |
| 5,839,201 A | | 11/1998 | Young |
| 6,543,144 B1 | | 4/2003 | Morin |
| 7,047,655 B2 | | 5/2006 | Larsson |
| 10,532,603 B2 | * | 1/2020 | Hummel ................ B25H 7/02 |
| 2004/0172841 A1 | | 9/2004 | Larsson |
| 2011/0138643 A1 | * | 6/2011 | Gao ................ G01B 3/56 |
| | | | 33/465 |
| 2019/0225009 A1 | | 7/2019 | Hummel |
| 2021/0072012 A1 | | 3/2021 | Andersson |

FOREIGN PATENT DOCUMENTS

| | | |
|---|---|---|
| GB | 532738 A | 1/1941 |
| GB | 2201251 A | 8/1988 |
| GB | 2396432 A | 6/2004 |
| WO | 0177609 A1 | 10/2001 |

OTHER PUBLICATIONS

Search Report dated Mar. 18, 2020, by the European Patent Office for Application No. 19196421.2.
Office Action dated Dec. 23, 2021, issued in the corresponding Canadian Patent Application No. 3,092,537, 4 pages.
Office Action dated Dec. 22, 2021, issued in the corresponding Canadian Patent Application No. 3,092,539, 5 pages.
Communication Pursuant to Article 94(3) EPC dated Sep. 29, 2021, issued in the European Patent Application No. 19196421.2, 3 pages.
European Search Report mailed in priority application No. EP 19196420.4, dated Mar. 9, 2020, 5 pages.

* cited by examiner

STEPWISE ADJUSTABLE SQUARE

TECHNICAL FIELD

The present invention relates to a stepwise adjustable square for use in carpentry.

BACKGROUND ART

A square is generally an instrument having at least one right angle and two straight edges used especially to lay out or test right angles. It may also be referred to a carpenter's square.

A non-adjustable or fixed square has a (longer) blade and a (shorter) stock which meet at a fixed angle of 90 degrees. The whole square could be made of steel, or the blade could be made stainless of steel while the stock is made of plastic or aluminium or magnesium, for example. The blade is typically marked with units of length, such as centimetres.

An adjustable square can be set to several positions. GB2396432 A discloses an adjustable square which comprises a blade and a handle, corresponding ends of which pivot about a common pivot axis. Connection means allows for the pivoting movement of the blade and handle about the pivot axis. The pivoting movement is limited by an indexing mechanism comprising of first and second matching profiled plates, the first plate has a series of radial ridges and the second plate has a corresponding series of radial grooves, the engagement of which results in the square being locked at a specific angle. The plates are biased into engagement with each other by a spring member which augments the locking action when a ridge of the first plate engages with a groove of the second plate. The spring is held in compression by the connection means. The adjustable square of GB2396432 A appears to be stepwise adjustable between 0-180 degrees.

Another stepwise adjustable square is Adjustable Square QUATTRO by Hultafors. The Adjustable Square QUATTRO can be set to three positions: 45°, 90°, and 135°.

SUMMARY OF THE INVENTION

While existing stepwise adjustable squares may be very useful, there is still room for improvement. It is therefore an object of the present invention to provide an improved stepwise adjustable square.

According to an aspect of the invention, this and other objects are achieved by a stepwise adjustable square for use in carpentry, comprising: a stock; and a blade rotatable relative to the stock around an axis of rotation between a first extreme position at zero degrees, where the blade is parallel to the stock and partly provided in a space of the stock, and a second extreme position at about 270 degrees, where the blade is substantially perpendicular to the stock. That is, the blade is rotatable (approximately) 270 degrees relative to the stock around the axis of rotation.

The stock could also be referred to as a tongue.

The present invention is based on the understanding that being able to move the blade up to (about) 270 degrees greatly enhances the usability of the stepwise adjustable square. To the inventor known stepwise adjustable squares can only move the blade up to less than 180 degrees.

The stock may have first and second longitudinal edges, wherein the space has a first slot that extends along the complete first longitudinal edge for receiving the blade in the first extreme position, wherein the space has a second slot that extends along only a portion of the second longitudinal edge for receiving the blade in the second extreme position, and wherein the remainder of the second longitudinal edge does not have a slot. This is useful in case one uses the adjustable square with the blade at 270 degrees and works with thin items such as sheet metal which can rest against the slot-less remainder of the second longitudinal edge. If the second slot would extend along the complete second longitudinal edge, the sheet metal could easily enter into such a slot. The first longitudinal edge preferably extends along the complete length of the stock. The second longitudinal edge preferably extends along the complete length of the stock. In other words, the first and second longitudinal edges may extend all along the stock.

The blade when positioned at 90 degrees can have an exposed short edge portion aligned with the second longitudinal edge of the stock and forming a right corner with the upper edge of the blade. This means that the adjustable square can have an "clean" perpendicular exterior contour similar to many non-adjustable or fixed squares, which may be useful for many types of measurements.

The heel of the adjustable square when the blade is in the second extreme position at about 270 degrees may be at least partly rounded. This allows the present square to properly bear against surfaces arranged at 90-180 deg angle without the (at least partly rounded) heel interfering, which in turn means that one readily can copy or transfer an obtuse angle. To achieve the at least partly rounded heel, both the blade and the stock could have an at least partly rounded corner.

The blade may have one or more marking slots. The marking slot(s) may allow a user to accurately mark a certain distance from the edge of an object, for example by means of a pencil or dry marker.

In one embodiment, the marking slots are arranged in at least two parallel rows extending in the length direction of the blade, wherein the marking slots of one row are longitudinally offset with the marking slots of another row, and wherein the marking slots of at least one of the rows are serrated to allow marking of several distances in each such marking slot. This may increase the marking resolution (it may for example allow every millimetre or every 2.5 mm to be marked), with maintained strength/integrity of the blade.

In another embodiment, each marking slot is elongated in the length direction of the blade and non-uniformly serrated to allow marking of several distances in each such marking slot. Each marking slot may for example have a mm scale serration (toothing) on one side and a cm scale serration on the opposite side.

In yet another embodiment, the marking slots could be arranged in one row extending in the length direction of the blade.

The marking slot(s) could be applied also to a fixed (non-adjustable) square.

The second longitudinal edge including the portion along which the second slot extends and the remainder of the second longitudinal edge may be straight, i.e. form a straight line. This may facilitate and stabilize marking using for example the above-mentioned marking slot(s) when the blade is in the second extreme position at about 270 degrees, since the user can rest the complete straight second longitudinal edge of the stock against the edge of the object, as opposed to a longitudinal edge of a stock that e.g. diverts 45 deg. in level with the blade.

The blade may be made of stainless steel and/or be marked with units of length. The blade may for example have millimetre graduations (in addition to any marking slot(s) as discussed above).

The (stepwise adjustable) square may further comprise: a first alignment structure adapted to rotate rigidly with the stock around the axis of rotation; a second alignment structure complimentary to the first alignment structure and adapted to rotate rigidly with the blade around the axis of rotation; and a spring device which in conjunction with a spring expansion-restricting element of the adjustable square is adapted to axially press the second alignment structure towards the first alignment structure, wherein the first alignment structure and the second alignment structure at certain angles between the stock and the blade align and engage such that a force of the spring device is reduced compared to the force at angles where the first and second alignment structures do not align for stepwise adjustment.

The first and second alignment structures may each comprise radial ridges and valleys, both with inclined sides. At least partly due to the inclined sides, the user can adjust the square by only manoeuvring the blade and stock.

BRIEF DESCRIPTION OF THE DRAWINGS

This and other aspects of the present invention will now be described in more detail, with reference to the appended drawings showing one or more embodiments of the invention.

FIG. 2b show details of alignment structures of the square of FIG. 2a.

FIGS. 3 to 7a-b show the stepwise adjustable square according to one or more embodiments of the present invention with the blade at 0 degrees, 270 degrees, 90 degrees, 225 degrees, and 270 degrees, respectively.

DETAILED DESCRIPTION

Figure 1:
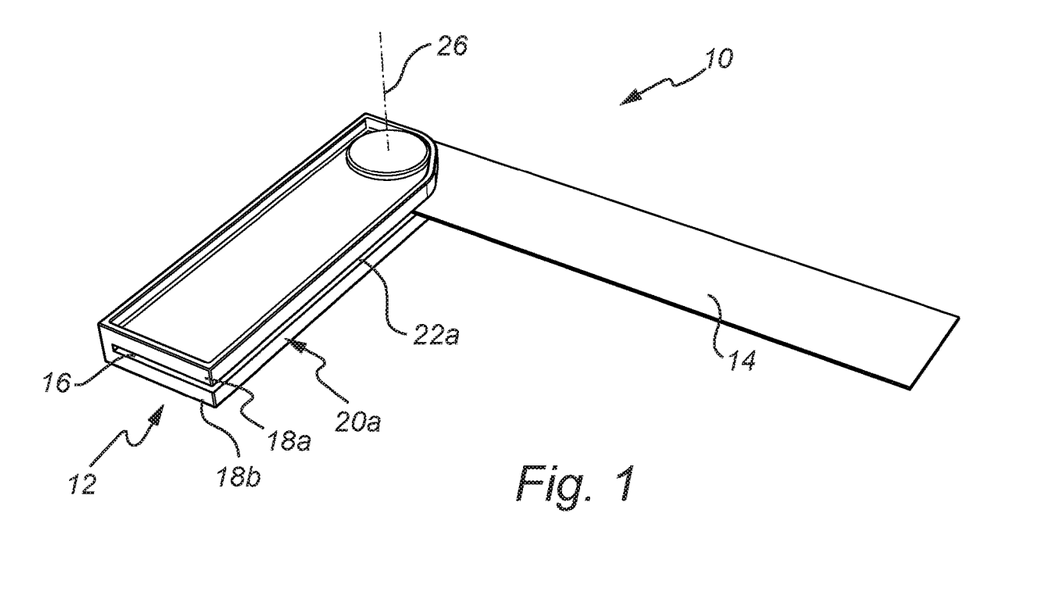
FIG. 1 is a perspective view of a stepwise adjustable square according to an embodiment of the present invention.

FIG. 1 is a perspective view of a stepwise adjustable square 10 (hereinafter referred to simply as "square") according to an embodiment of the present invention.

The square 10 comprises a stock 12 and a blade 14.

Figure 3:
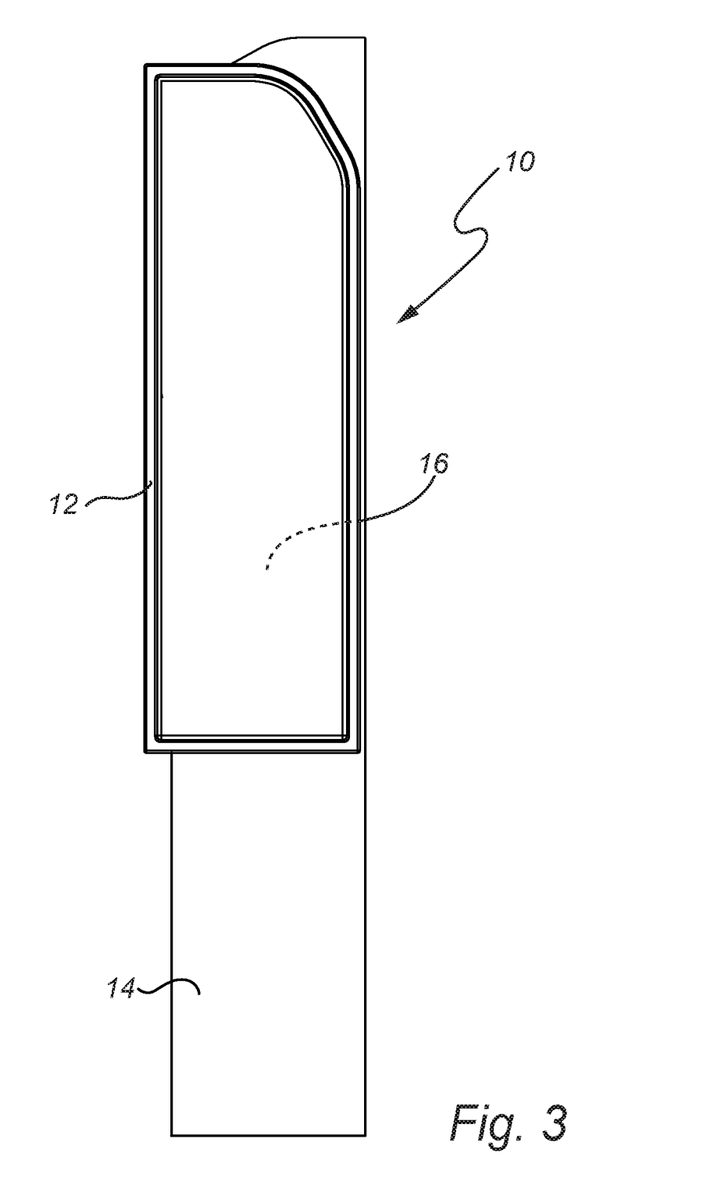

The stock 12 may comprise a(n internal) space 16 between first and second parallel stock portions 18a-b, in which space 16 the blade 14 may be partly provided (see for example FIG. 3). The stock 12 may further have first and second longitudinal edges 20a-b, wherein a first slot 22a to the space 16 extends along the complete first longitudinal edge 20a, and wherein a second slot 22b to the space 16 extends along only a portion of the second longitudinal edge 20b while the remainder 24 of the second longitudinal edge 20b does not have any slot (see FIG. 4). The stock 12 could be made of (anodised) aluminium or magnesium or plastic, for example.

The blade 14 blade is rotatable relative to the stock 12 around an axis of rotation 26. The blade 14 has a generally rectangular shape and can be marked with units of length, such as millimetre graduations. The blade 14 can for example be made of stainless steel.

Figure 2A:
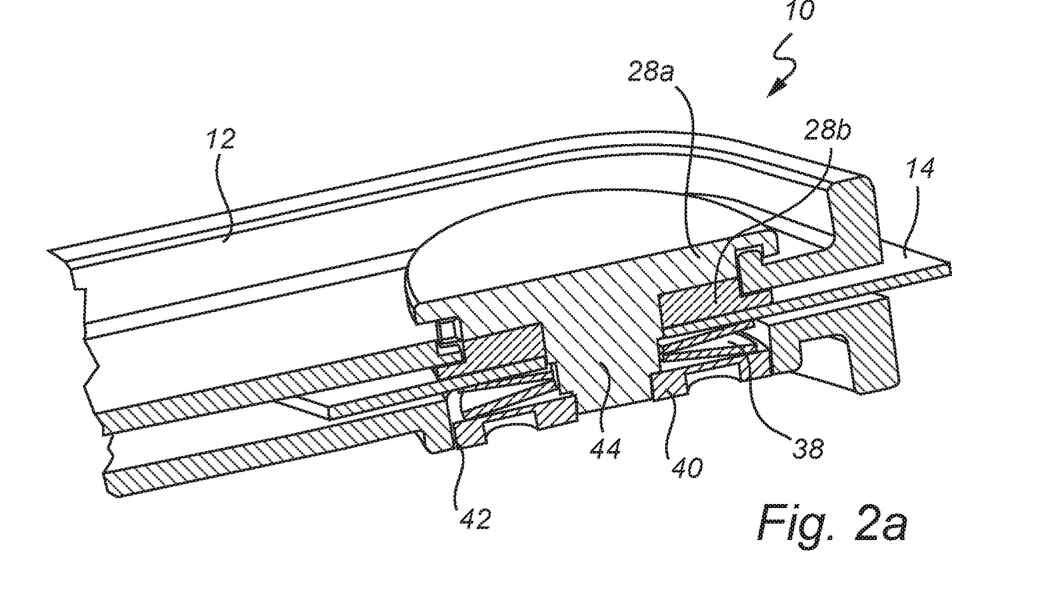
FIG. 2a is a partial cross-sectional perspective view of the adjustable square of FIG. 1.
Figure 2B:
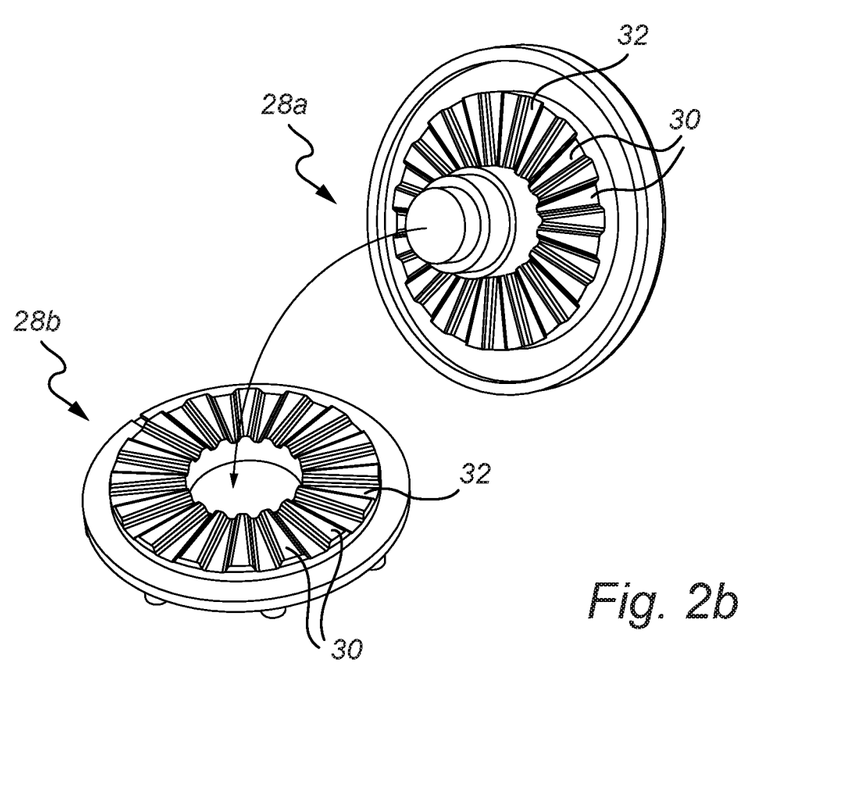

With further reference to FIGS. 2a-b, the square 10 may further comprise a first alignment structure 28a adapted to rotate rigidly with the stock 12 around the axis of rotation 26, and a second alignment structure 28b complimentary to the first alignment structure 28a and adapted to rotate rigidly with the blade 14 around the axis of rotation 26. The first and second alignment structures 28a-b may each comprise a (ring-shaped) surface with radial ridges 30 and valleys 32, similar to a crown gear. Typically, a radial ridge 30 of the first alignment structure 28a fits or matches a radial valley 32 of the second alignment structure 28b, and so on. The radial ridges 30 and valleys 32 should have inclined sides, as shown in FIG. 2b.

The square 10 may further comprise a spring device 38, which in conjunction with a spring expansion-restricting element 40 is adapted to axially press the second alignment structure 28b towards the first alignment structure 28a. The spring expansion-restricting element 40 may for example be a (circular) plate fixedly arranged in an aperture 42 of the second stock portion 18b of the stock 12. The spring expansion-restricting element 40 may be rigidly connected to the first alignment structure 28a, here by an intermediate column 44 coaxial with the axis of rotation 26. The first alignment structure 28a and the intermediate column 44 could be integral with each other, i.e. formed in one piece. The spring device 38 may be dual conical spring washers, for example. The spring device 38 may be arranged about the intermediate column 44 and between the spring expansion-restricting element 40 and the blade 14 (on the opposite side of the blade 14 compared to the second alignment structure 28b). The second alignment structure 28b, the blade 14, and the spring device 38 may each have a central opening in which the intermediate column 44 is received.

In stepwise adjustment of the square 10, the first alignment structure 28a and the second alignment structure 28b at certain angles between the stock 12 and the blade 14 align and engage such that a force of the spring device 38 is reduced compared to the force at angles where the first and second alignment structures 28a-b do not align. Namely, when the ridges 30 of the first alignment structure 28a are received in the valleys 32 of the second alignment structure 28b and vice versa, the force of the spring device 38 is lower than when the ridges 30 of the first alignment structure 28a and the ridges 30 of the second alignment structure 28b are abutting each other. Hence, the square 10 can be set to several distinct positions (e.g. 22.5 degrees steps or 45 degrees steps) corresponding to said certain angles. It is appreciated that when the user here rotates the blade 14 relative to the stock 12, the user will feel when the blade 14 "snaps" into one of those distinct position. By exerting some greater rotational force (to get the ridges 30 out of the valleys 32), the user can easily move the blade 14 to the next distinct position.

Figure 4:
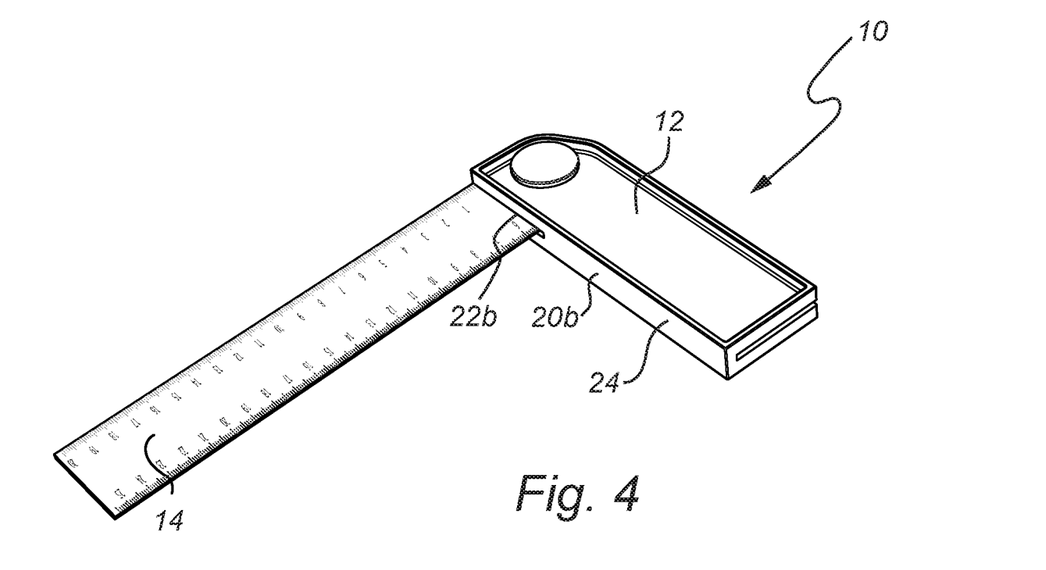

Turning to FIGS. 3 to 7a-b, the blade 14 of the square 10 is rotatable relative to the stock 12 around the axis of rotation 26 between a first extreme position at zero degrees where the blade 14 is parallel to the stock 12 and partly provided in the aforementioned space 16 of the stock 12 (FIG. 3), and a second extreme position at about 270 degrees where the blade 14 is substantially perpendicular to the stock 12 (FIG. 4). That is, the blade 14 is rotatable (approximately) 270 degrees relative to the stock 12 around the axis of rotation 26. In the second extreme position, the blade 14 is received in the second slot 22b of the second longitudinal edge 20b of the stock 12. With 22.5 degrees steps, this results in twelve distinct positions. With 45 degrees steps, the square 10 could have six distinct blade positions (apart from the position at zero degrees when the blade 14 is in the stock 12).

Figure 5:
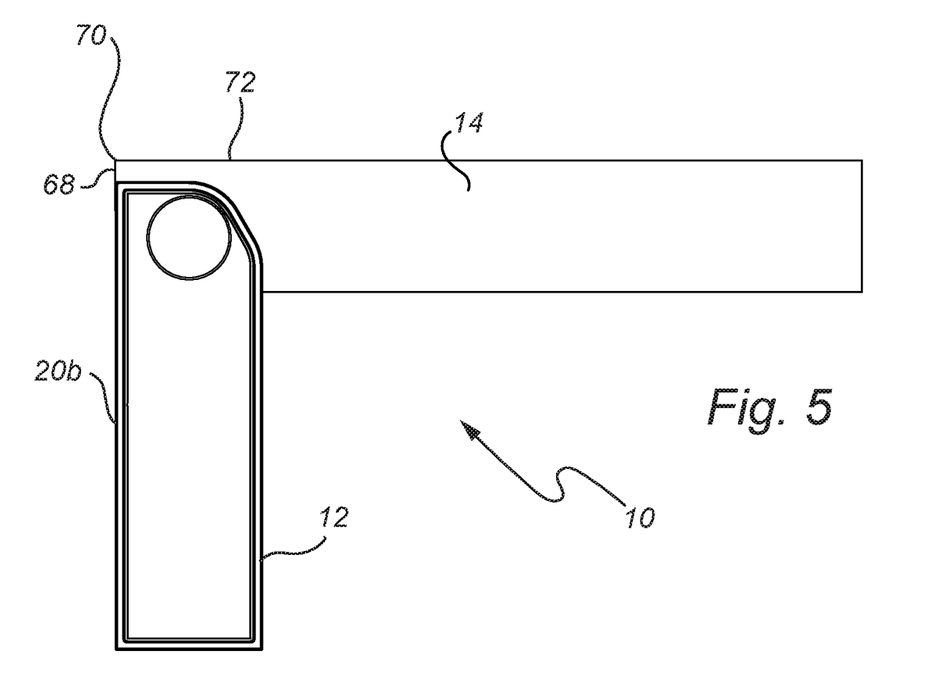

As seen when positioned at 90 degrees (FIG. 5), the blade 14 can have an exposed short edge portion 68 aligned with the second longitudinal edge 20b of the stock 14 and forming a right corner 70 with the upper edge 72 of the blade 12. This means that the square 10 can have an "clean" or continuous perpendicular exterior contour, as seen in FIG. 5.

Figure 6:
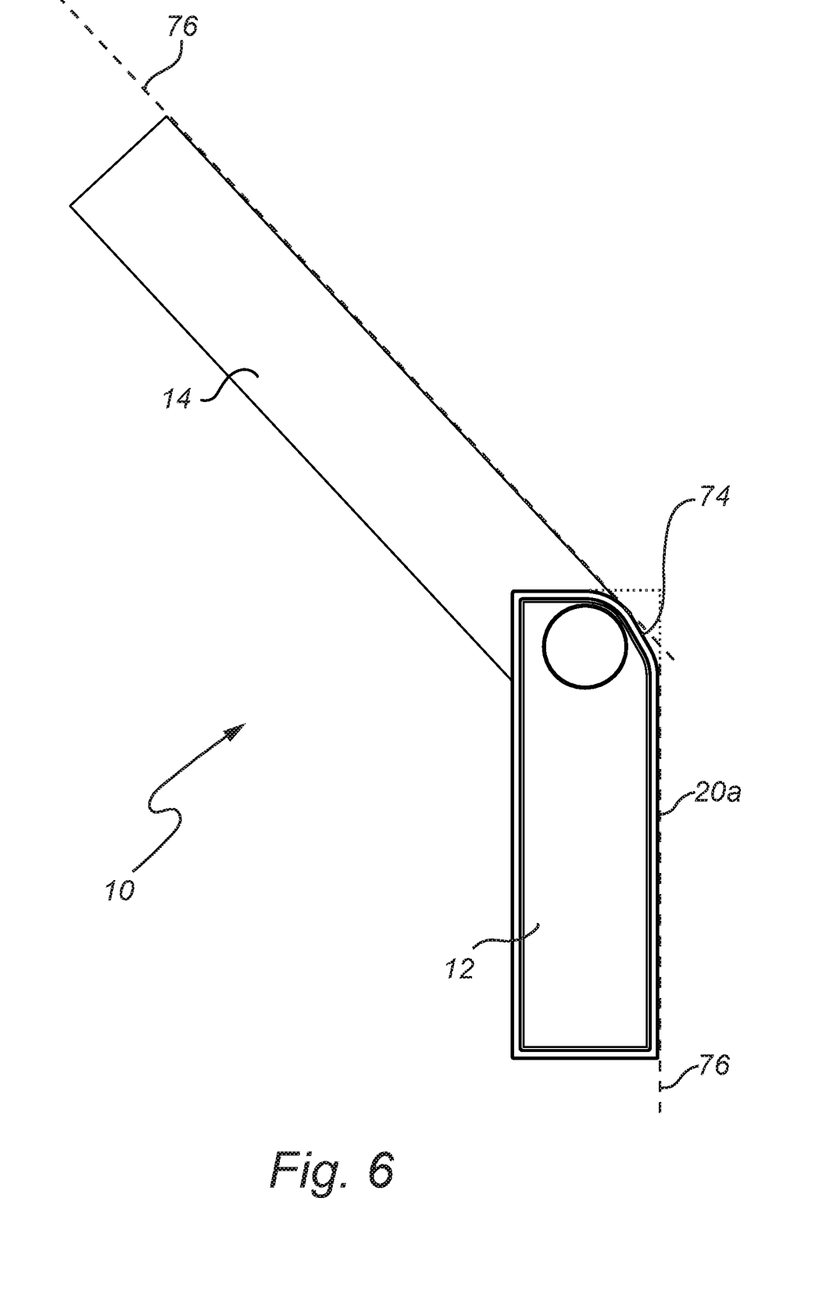

In FIG. 6, the so-called heel 74 of the square 10 (as seen when the blade 14 is in the second extreme position at about 270 degrees) is at least partly rounded. This allows the square 10 to properly bear against surfaces 76 arranged at 90-180 deg angle without the heel 74 interfering. This is readily appreciated when considering the dotted non-rounded heel also shown in FIG. 6 just for comparison purposes. To achieve the at least partly rounded heel 74, both the blade 14 and the stock 12 may have an at least partly rounded corner at (the "top" of) the first longitudinal edge 20a.

Figure 7A:
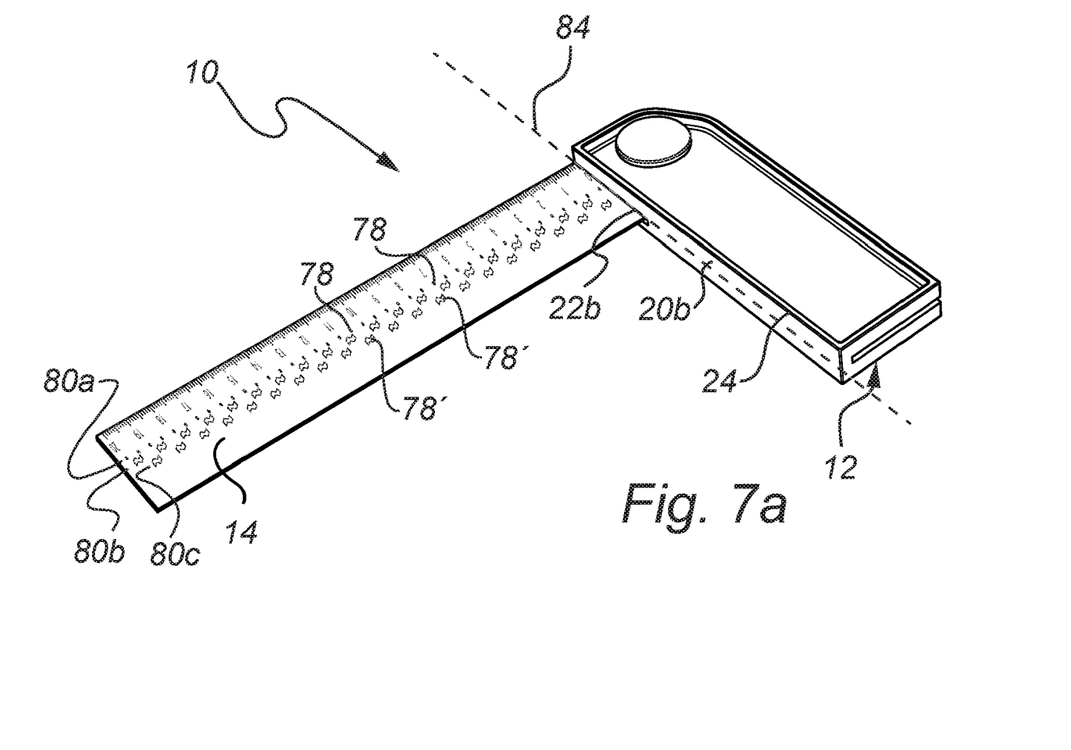
Figure 7B:
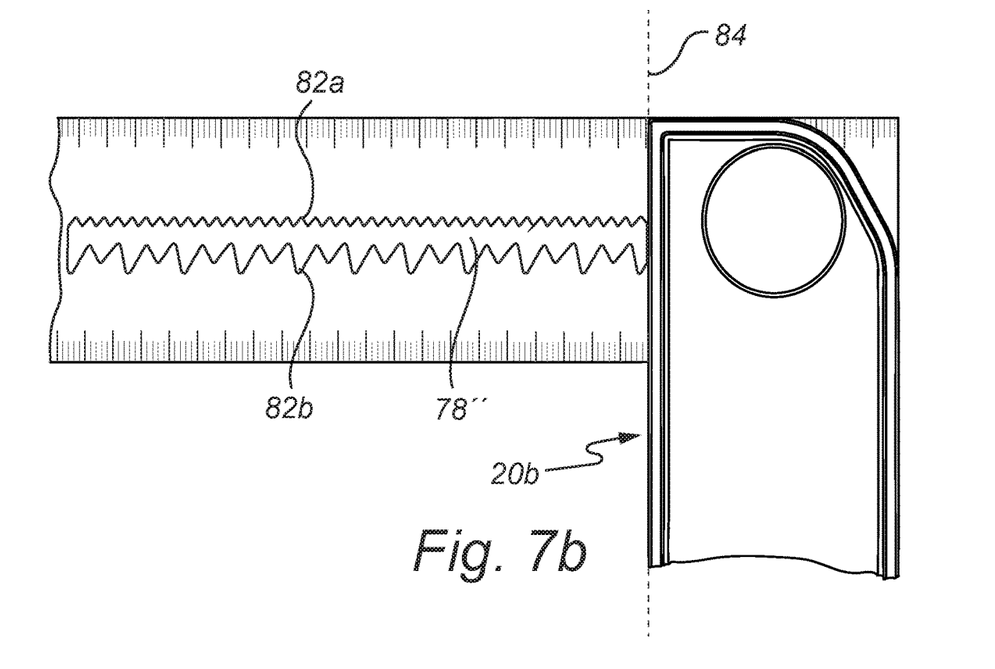

In FIGS. 7a-b, the blade 14 has one or more marking slots 78.

In FIG. 7a, the marking slots 78 are arranged in three parallel rows 80a-c extending in the length direction of the blade 14. The marking slots 78 of one row are longitudinally offset with the marking slots 78 of every other row. In FIG. 7a, the marking slots 78 of row 80a are single millimetre marking slots, whereas the marking slots 78' of rows 80b-c are serrated to allow marking of four millimetres in each marking slot 78', which in turn allows every millimetre to be marked. Specifically, seen longitudinally, between each marking slot 78 of row 80a there is alternatingly a serrated marking slot 78' of row 80b or a serrated marking slot 78' of row 80c, as illustrated in FIG. 7a.

In FIG. 7b, the marking slot 78" is elongated in the length direction of the blade 14 and non-uniformly serrated to allow marking of several distances in the marking slot 78". The marking slot 78" may for example have a mm scale serration (toothing) 82a on one side and a cm scale serration 82b on the opposite side. In FIG. 7b, the upper serration 82a allows marking of 2.5 millimetres, whereas the lower serration 82b allows marking of half centimetres. It is appreciated that the serrations could be designed in many different ways.

From FIGS. 7a-b it can also be seen that the second longitudinal edge 20b including the portion along which the second slot 22b extends and the remainder 24 of the second longitudinal edge is straight. This may facilitate and stabilize marking using the above-mentioned marking slots 78 when the blade 14 is in the second extreme position at about 270 degrees, since the user can rest the complete straight second longitudinal edge 20b of the stock 14 against the edge 84 of an object to be marked, The person skilled in the art realizes that the present invention by no means is limited to the preferred embodiments described above. On the contrary, many modifications and variations are possible within the scope of the appended claims.

For example, the stepwise adjustment feature could alternatively be realized with steel balls, like in Hultafors' Adjustable Square QUATTRO.

The invention claimed is:

1. A stepwise adjustable square for use in carpentry, comprising:
   a stock; and
   a blade rotatable relative to the stock around an axis of rotation between a first extreme position at zero degrees, where the blade is parallel to the stock and partly provided in a space of the stock, and a second extreme position at about 270 degrees, where the blade is substantially perpendicular to the stock,
   wherein the stock has first and second longitudinal edges, wherein the second longitudinal edge extends along the complete length of the stock, wherein the space has a first slot that extends along the complete first longitudinal edge for receiving the blade in the first extreme position, wherein the space has a second slot that extends along only a portion of the second longitudinal edge for receiving the blade in the second extreme position, and wherein the remainder of the second longitudinal edge does not have a slot.

2. A square according to claim 1, wherein the blade when positioned at 90 degrees has an exposed short edge portion aligned with a second longitudinal edge of the stock and forming a right corner with the upper edge of the blade.

3. A square according to claim 1, wherein the heel of the adjustable square when the blade is in the second extreme position at about 270 degrees is at least partly rounded.

4. A square according to claim 1, wherein the blade has one or more marking slots.

5. A square according to claim 4, wherein the marking slots are arranged in at least two parallel rows extending in the length direction of the blade, wherein the marking slots of one row are longitudinally offset with the marking slots of another row, and wherein the marking slots of at least one of the rows are serrated to allow marking of several distances in each such marking slot.

6. A square according to claim 4, wherein each marking slot is elongated in the length direction of the blade and non-uniformly serrated to allow marking of several distances in each such marking slot.

7. A square according to claim 1, wherein the second longitudinal edge including the portion along which the second slot extends and the remainder of the second longitudinal edge is straight.

8. A square according to claim 1, wherein the blade is made of stainless steel and/or is marked with units of length.

9. A square according to claim 1, further comprising:
   a first alignment structure adapted to rotate rigidly with the stock around the axis of rotation;
   a second alignment structure complementary to the first alignment structure and adapted to rotate rigidly with the blade around the axis of rotation; and
   a spring device which in conjunction with a spring expansion-restricting element of the adjustable square is adapted to axially press the second alignment structure towards the first alignment structure,
   wherein the first alignment structure and the second alignment structure at certain angles between the stock and the blade align and engage such that a force of the spring device is reduced compared to the force at angles where the first and second alignment structures do not align for stepwise adjustment.

10. A square according to claim 9, wherein the first and second alignment structures each comprises radial ridges and valleys, both with inclined sides.

11. A square according to claim 1, wherein the second longitudinal edge including the portion along which the second slot extends and the remainder of the second longitudinal edge is straight, and wherein the blade has one or more marking slots.

* * * * *